Oct. 2, 1962  H. U. NEIDHARDT  3,056,903
CONTROL ARRANGEMENT FOR GAS-DISCHARGE TUBES
Filed March 4, 1958  3 Sheets-Sheet 2

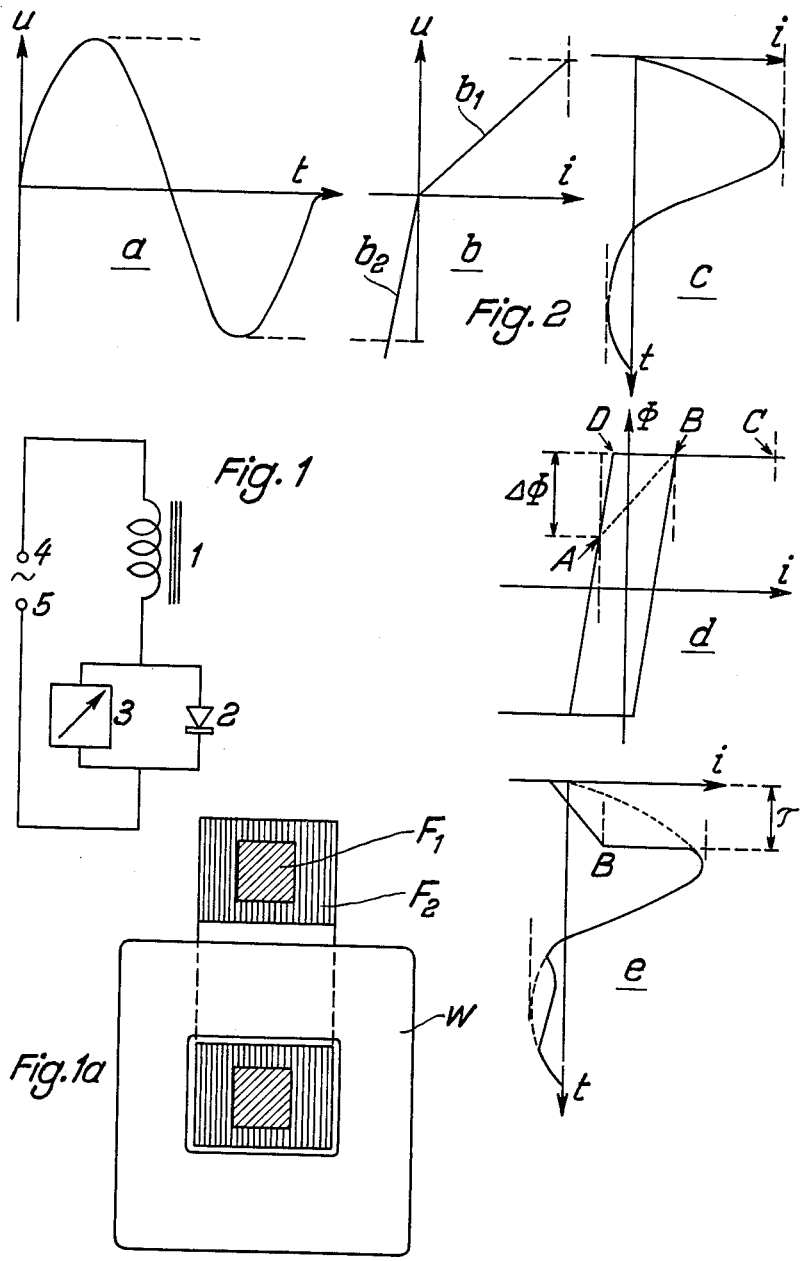

Inventor:
Hans U. Neidhardt
by:
Michael S. Striker
Attorney

Oct. 2, 1962   H. U. NEIDHARDT   3,056,903
CONTROL ARRANGEMENT FOR GAS-DISCHARGE TUBES
Filed March 4, 1958   3 Sheets-Sheet 3

Inventor:
Hans U. Neidhardt
by:
Michael S. Striker
Attorney

United States Patent Office 3,056,903
Patented Oct. 2, 1962

3,056,903
CONTROL ARRANGEMENT FOR GAS-DISCHARGE TUBES
Hans U. Neidhardt, Zurich, Switzerland, assignor to H. A. Schlatter Aktiengesellschaft, Zurich, Switzerland
Filed Mar. 4, 1958, Ser. No. 719,093
Claims priority, application Switzerland Mar. 4, 1957
18 Claims. (Cl. 315—203)

The present invention relates to a control arrangement for gas-discharge tubes which is particularly useful and designed for the control of ignitrons connected in the primary circuit of the transformer of resistance welding equipment.

In order to satisfy operating conditions of such welding machines the control arrangement must permit a continuous adjustment of the welding current. For this purpose linear operating, phase-shifting networks have been proposed by means of which the phase relation between the control A.C. voltage and the anode A.C. voltage of the tubes can be regulated. Such control arrangements are suitable for the control of thyratrons; however, these arrangements do not permit to obtain the steeply rising and relatively high current peaks, such as are required for igniting ignitrons.

A second requirement applying to control arrangements of the type set forth consists in the fact that it is necessary to avoid current impulses of too great intensity at the moment when the operating circuit is being closed. Such current impulses can develop whenever the current has been previously interrupted at a moment when it had a high instantaneous value so that a substantial remanent flux was left in the core of the welding transformer. If under such circumstances the circuit is closed again during a half-wave corresponding to a current flow in the same direction as that which existed at the moment of the preceding interruption, then at the moment of closing the circuit first only a small change of the flux and accordingly only a small countervoltage is produced so that an exceedingly intense current impulse is entailed. In order to avoid this inconvenience, synchronous regulators have been proposed which serve to arrange for a closing of the circuit only when a half-wave appears which is opposite to that which existed at the moment of interrupting the circuit.

In many cases modern welding procedure calls even for such a control arrangement that would cause the intensity of the welding current to increase to a predetermined value only gradually during several periods of the alternating current; frequently a gradually decreasing flow of current is also desired at the time of interrupting the current. However, in a similar manner as the above-mentioned synchronous regulators also the known types of control arrangements of the type referred to in this paragraph are comparatively involved and expensive.

It is, therefore, a main object of this invention to provide a control arrangement for gas-discharge tubes, and particularly for use in connection with resistance welding equipment, which fulfills all the requirements applying to such control arrangements, without the inconveniences or drawbacks of the known types of equipment.

It is another object of this invention to provide a control arrangement of the type set forth which is a comparatively simple combination of more or less standard elements so that it can be produced at a reasonable cost.

It is a further object of this invention to provide a control arrangement of the type set forth which permits to raise the efficiency and quality of resistance welding operations to a level not reached up to now.

It is still another object of this invention to provide a control arrangement generally of the type set forth that can be used to similar advantages also in connection with other electronic installations calling for this type of control.

With above objects in view a control arrangement according to this invention, to be used for the control of a gas discharge tube having a cathode, an anode and an igniting electrode comprises an igniting circuit including said igniting electrode and the cathode; a choke coil having a ferromagnetic core and being connected in the igniting circuit for the purpose of influencing the rise and fall of current therein; valve means in series with the choke coil in the igniting circuit, and bypass means including a resistance of predetermined amount and connected in parallel with the valve means for modifying the rectifying effect of the valve means, said choke coil and said bypass means being so dimensioned that upon application of an operating A.C. potential to said igniting circuit each half-wave passing said valve means causes said core to become oversaturated with one polarity and that each following half-wave passing through said bypass means causes a reversal of magnetization of said core to a degree depending on said predetermined amount of resistance.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

FIG. 1 is a circuit diagram illustrating the basic idea underlying all the embodiments of this invention;

FIG. 1a is a diagrammatic cross-sectional view illustrating certain details of a preferred construction of a choke coil used in the various embodiments;

Figure 3:
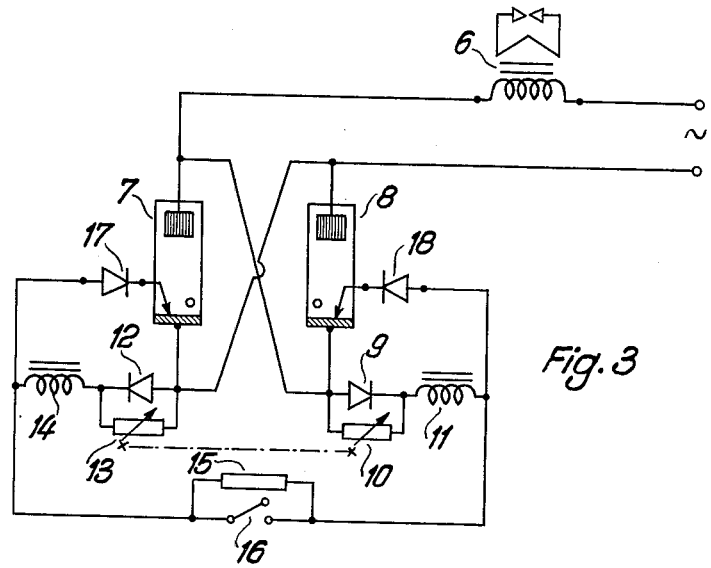
Figure 4:
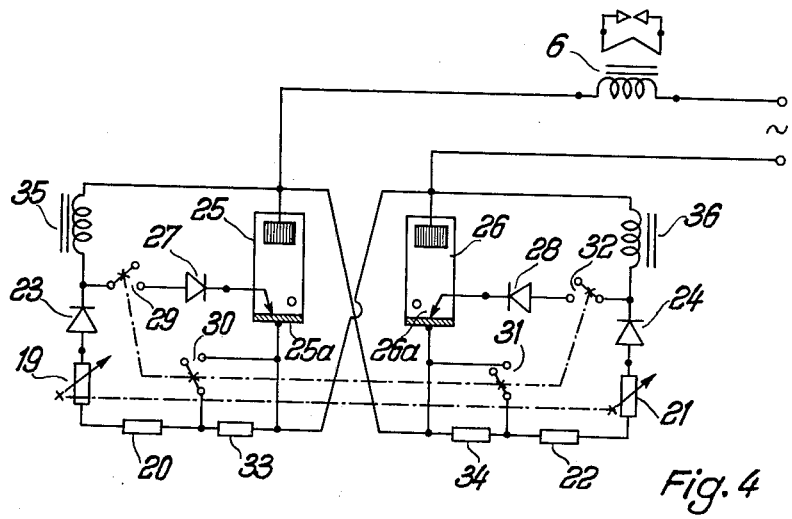
Figure 5:
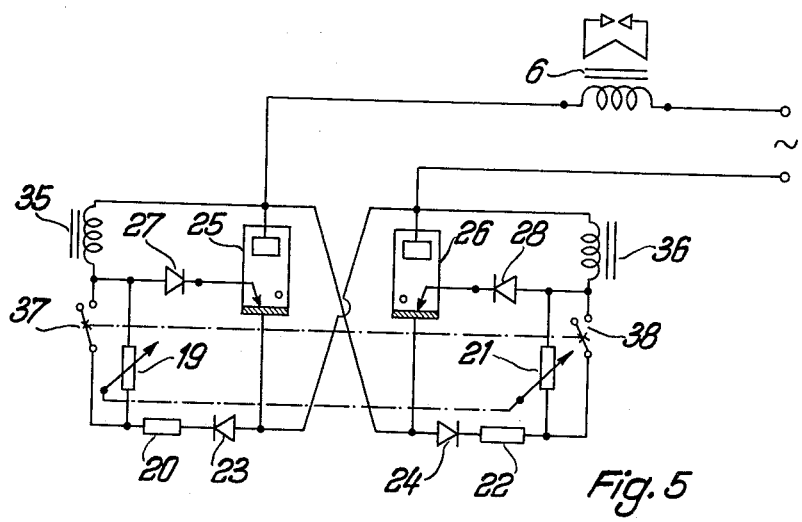
Figure 6:
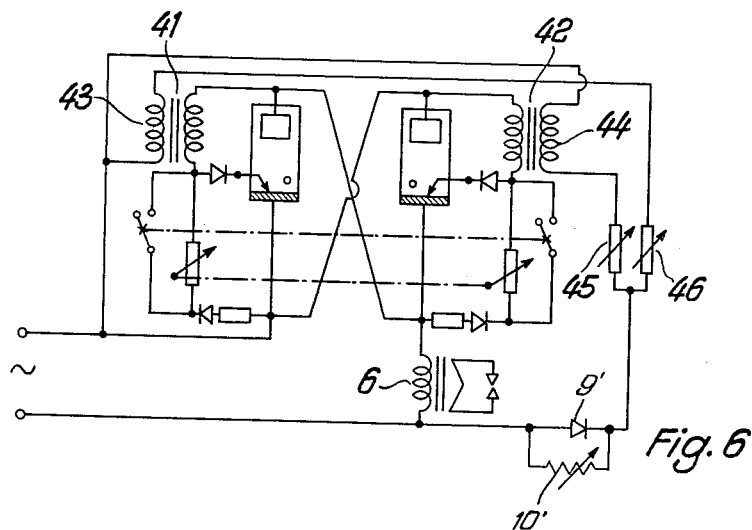

FIG. 2 composed of portions a, b, c, d and e is a correlated group of graphic illustrations of the electric and electromagnetic processes observed during operation of an embodiment of the invention;

FIG. 3 is a circuit diagram illustrating one embodiment of the invention;

FIG. 4 is a circuit diagram of a modified embodiment of the invention;

FIG. 5 is a circuit diagram of an embodiment that is a modification of that shown by FIG. 4; and FIG. 6 is a circuit diagram of another modification of the embodiment shown in FIG. 4.

Referring now to FIG. 1, a choke coil 1 is connected in series with a valve 2, and a bypass means 3 is connected in parallel with the valve 2, the operating circuit containing the above-mentioned elements in a series combination being completed by circuit means connecting it to terminals 4, 5 to which an external A.C. voltage may be applied. The bypass means 3 is supposed to have permeability of variable magnitude and may consist, for instance, of a variable ohmic resistance. However, it may also consist, for instance, of a saturable reactor, an electron or gas-discharge tube poled in a sense opposite to the direction of current passing through the valve, or of a transistor, or any other element having variable resistivity. The combination of the valve 2 and the bypass element 3 evidently constitutes a modified or "incomplete" rectifier which permits some current to flow also in a direction opposite to that of the rectified current, the amount of the reverse flow being adjustable by means of the bypass element 3. The choke coil 1 should be so dimensioned that its core reaches oversaturation within the duration of each half-wave which passes in the direction permitted by the action of valve 2; then, within the duration of the next following opposite half-wave the effect of the bypass element 3 is such that the magnetization of the core is definitely reversed to a degree which depends on the actual or adjusted resistance or permeability of this element 3.

Referring now also to the diagrammatic illustration given by FIG. 2, it will be understood that when an operating A.C. voltage $u$ is applied to the terminals 4, 5 the various phenomena illustrated by the diagrams FIG. 2a–e are caused to occur. In the portion $a$ of FIG. 2 the sinusoidal curve illustrates the variation of the voltage $u$ as a function of the time $t$ during one period. The diagram $b$ of FIG. 2 illustrates the characteristic of the "incomplete" rectifier combination 2, 3, the curve portion $b_1$ representing the sum of the currents flowing in the same direction through the valve 2 and the bypass element 3, in other words the passing current $+i$ of the "incomplete" rectifier; the other curve portion $b_2$ represents the current flowing only through the bypass element 3 in a direction opposite to said passing current, in other words the reverse current $-i$ of the rectifier combination. The curve diagram in the portion $c$ of FIG. 2 illustrates the variation of the current $i$ during the incomplete rectification of one period of the A.C. current passing through the valve and bypass combination; the form of this curve can be constructed by additive combination of the curve in diagram $a$ and the curves $b_1$ and $b_2$.

The deformed alternating current $i$ as illustrated by diagram $c$, while passing through the choke coil 1, creates in the core of this coil a magnetic flux $\Phi$. The diagram $d$ of FIG. 2 illustrates the magnetization curve for the core in relation to the current flowing in the coil. In accordance with the current curve of diagram $c$ the magnetization of the choke core during each period of the incompletely rectified alternating current $i$ is represented by the continuous sequence of line elements ABCBDA which shows that the magnetic flux is changed between A and B as well as between D and A by an amount $\Delta\Phi$; however, along the line sequence BCD the magnetic flux remains unchanged. Since every change of the flux with time, represented by $d\Phi/dt$, induces a countervoltage $-u$ in the choke coil, a current fully corresponding to the voltage applied to the terminals 4, 5 will flow through the choke coil only as long as the magnetic flux does not change, in other words when the magnetization is in the stage corresponding to the line sequence BCD. However, during the stages corresponding to the line portions AB and DA the effective voltage is smaller than the line voltage applied to the terminals 4, 5, since it is equal to the difference between this line voltage and the induced countervoltage. Consequently, in a voltage curve diagram of the resulting effective voltage areas corresponding to $\int udt = \Delta\Phi$ would be missing as compared with the voltage curve in diagram $a$ of FIG. 2; the loss of these areas in the voltage diagram entails a corresponding loss of areas in the current diagram. Therefore, in the current diagram $e$ of FIG. 2 the curve representing current $i$ versus time during one period has the distorted shape as shown. It can be seen that in this diagram the current curve abruptly rises steeply at that moment which corresponds to the point B during the stage of magnetization represented by the line ABC. From this point B as far as to point D of the magnetization curve the current $i$ is determined solely by the ohmic resistances in the circuit of FIG. 1.

The time element $\tau$ shown in FIG. 2, diagram $e$, and correlated with the abrupt steep rise of the current, depends evidently upon the magnitude of the "loss area" of the current diagram (this area being defined between the curve portion shown in dotted lines and the distorted curve indicated in full lines) and accordingly depends upon $\int udt = \Delta\Phi$. The change of flux $\Delta\Phi$ is, however, a function of the reverse current as can be seen from the diagrams $c$ and $d$ of FIG. 2. From this can be concluded that the relative phase position of the abovementioned abrupt rise of current depends upon the reverse current determined by the "incomplete rectifier," and therefore can be controlled and adjusted by the bypass element 3.

On account of this condition the relative phase position of the moment of igniting a gas-discharge tube can be regulated by means of the bypass element 3 if the current passes through the choke coil having the wave form illustrated by the curve in diagram $e$ of FIG. 2 and if a potential derived from this current is used for controlling a gas-discharge tube. The abrupt rise of current in the moment defined by the time element $\tau$ results in a precise definition of the moment of ignition and furnishes particularly in the case of the use of ignitrons the substantial changes of current intensity which are required in the igniting circuit of ignitrons. It is evident that not only the total current passing through the choke coil 1 and through the combination 2, 3 may be used for creating the desired control impulse, but also for instance the portion of the current passing through the valve 2 or a voltage derived therefrom.

It has been found that the effective value of the anode current of a gas-discharge tube the control voltage of which is furnished by a control arrangement as set forth, first immediately after closing the circuit starts with relatively small values and rises only gradually during several periods to a final and predetermined value provided that the control elements 1, 2, 3 are properly dimensioned. This behavior is particularly desirable for the control of electrical resistance welding machines; this is quite understandable if one considers that the current flowing through the choke coil contains a D.C. component and an A.C. component. If the time factor of the whole circuit is chosen properly then the process of circuit closing for the D.C. component stretches over several periods of the A.C. current, and only after the completion of these several periods a stationary condition appears. However, up to the time when this stationary condition is reached the inverse voltage or countervoltage produced by the D.C. component is effective so that the time element $\tau$ first becomes greater than it is later when conditions are stationary, the time element changing step-by-step from said first greater value to the later final value. Consequently, the igniting of the controlled gas-discharge tube is carried out first with a step-by-step decreasing time lag, and the effective value of the anode current is at the beginning smaller than later when conditions are stationary.

The control arrangement according to the invention makes it also possible to provide for a gradual decrease of the above-mentioned effective value during the process of interrupting the circuit. To obtain this result, all that is needed is to connect the circuit combination 1, 2, 3 in series with the disconnecting switch and to shunt this switch with a resistor which permits a continuous current to pass through the igniting circuit of the gas-discharge tube, said current, however, not being sufficient to cause ignition. Under these circumstances, upon interrupting the circuit a gradual decrease of the D.C. component occurs so that an additional voltage is induced which together with the A.C. component flowing through the above-mentioned shunt resistor suffices, provided the elements of the circuit are properly chosen, to produce a sequence of some anode current impulses which gradually grow weaker.

It is advisable to use for the core of the choke coil 1 a ferromagnetic material which can be saturated magnetically already by applying comparatively weak field intensities. Then, a small number of ampere-turns is sufficient for obtaining the effects described above. Moreover, it is desirable that the hysteresis loop characteristic of the particular material shows as abrupt a break as possible at the point of transition to saturation so that the rise of current in the choke coil 1 at the time $\tau$ occurs in such a manner that the current curve shows as steep a rise as possible. Materials having the above-mentioned properties are, for instance, the magnetic material 5000 Z of Hereaeus-Vacuum-Schmelze, Hanau, Germany and Trancor M 7 X of Armco Steel Corporation, Middletown, Ohio.

Magnetic materials having a very steep magnetization curve facilitate the provision of wide ranges of regulation of the time of igniting; however, the use of just these materials entails the disadvantage that operating conditions are less constant because already small variations of current result in substantial variations of the magnetic flux. Nevertheless, in certain welding operations both a large range of said regulation as well as a great stability of a set effective welding current are required.

In order to comply with these requirements within the control arrangements according to this invention it is advisable to use for the choke coils a core which is composed of magnetic materials having different magnetic characteristic. Preferably, a material having a very steep magnetization curve is combined with a material the magnetization curve whereof is much less steep. It is most advantageous to use a construction as indicated by FIG. 1a in which a core $F_1$ made of one type of material is surrounded by a shell $F_2$ made of a different material; depending upon which is the shape of the magnetization curve of the combined core that is wanted, the material having the steeper magnetization curve may be used either for the inner or for the outer portion of the compounded core.

FIG. 3 is a circuit diagram illustrating a control arrangement according to the invention in connection with a resistance welding machine. Connected in the primary circuit of the welding transformer 6 are two ignitrons 7 and 8 in back-to-back connection, and a control arrangement substantially of the type illustrated by FIG 1 is associated with each of the ignitrons 7 and 8. The ignitron 7 is controlled by the "incomplete rectifier" combination 9, 10 in connection with the choke coil 11; the ignitron 8 is similarly controlled by the rectifier combination 12, 13 in connection with the choke coil 14. Both these control arrangements are connected in series in a connecting circuit which connects the cathodes of the ignitrons 7 and 8 with each other and includes a switch 16 and an auxiliary resistor 15 in parallel with switch 16 so that by closing the switch 16 the resistor 15 is shunted. Connected in series with the ignitors of the ignitrons 7, 8, respectively, is a valve 17, 18, respectively, which permits the passage of only that igniting impulse which is supposed to ignite the particular ignitron.

It is desirable to use an auxiliary resistor 15 having such a dimension that when the switch 16 is in open position the circuit 9/10, 11, 15, 14, 12/13 is passed by a current which is not sufficient for igniting either one of the ignitrons 7, 8, but suffices for demagnetizing the choke coils 11, 14 even in those cases where possibly any one of these coils was in saturated condition at the moment when the switch 16 was opened.

As long as the switch 16 is in closed position the arrangement operates as follows: for instance, during the half-wave which causes the anode of the ignitron 7 to become positive, the control current flows through the rectifier 9, the choke coil 11 and the rectifier 17 to the ignitor of the ignitron 7; the rectifier 18 prevents during this time interval a shunting of the coil 11 by the circuit portion including the ignitor of the ignitron 8. However, the ignitron 7 is ignited only at that very moment ($\tau$) when the core of the choke coil 11 becomes saturated. During the next following half-wave the igniting current flows through the rectifier 12, the choke coil 14 and the rectifier 18 to the ignitor of the ignitron 8 while the rectifier 17 prevents shunting of the coil 14 by the circuit portion including the ignitor of the ignitron 7. The phase position of the moment of igniting is the same for both ignitrons 7 and 8 and can be adjusted jointly and simultaneously by means of the variable resistors 10, 13, respectively, which are preferably for this purpose operatively connected with each other; this mechanical connection is symbolized in FIG. 3 by a dot-dash line.

The control arrangement as described is particularly suited for a "slow control," i.e. a step-by-step rise and fall of the mean anode current at the time of closing and interrupting the circuit, respectively. The igniting current produced by the circuit portion 9–11 for the ignitron 7, of which a part is branched off through the coil 14 and the resistor 13 for the purpose of reversing the magnetization of the coil 14, produces in the series combination 13, 14 a voltage drop only until the ignitron 7 ignites; after ignition however the circuit including the ignitor and the cathode of the ignitron practically short-circuits the coil 14 so that the process of reversing the magnetization of this coil stops. The same applies to the next-following half-wave with regard to the choke coil 11 so that both choke coils after the closing of the main circuit are not immediately subjected to reverse magnetization, but only in a step-by-step increasing manner so that the phase position of the ignition shifts also step-by-step to increasingly shorter time lags ($\tau$). When the main circuit is interrupted the same sequence of events occurs with reverse effects.

The main circuit is interrupted by moving the switch 16 into its open position. However, the above-mentioned connection between the two igniting circuits remains conductive via the auxiliary resistor 15. This resistor 15 is so dimensioned that the alternating current passing therethrough is not sufficient for saturating the cores of the coils 11 and 14, but is sufficient to progressively demagnetize the same.

The control arrangement illustrated by the diagram of FIG. 4 is also designed for use with resistance welding machines and comprises two ignitrons 25, 26 which are connected in back-to-back arrangement in the primary circuit of the welding transformer 6, in order to control the latter. For the control of the ignitrons, choke coils 35, 36, respectively, are provided and connected respectively with main rectifiers 27, 28 in series with the ignitor-cathode circuits 25a, 26a, respectively. Connected between each choke coil and associated main rectifier is a starter switch 29, 32, respectively.

In order to provide for "incomplete rectification" each one of the two igniting circuits contains bypass means connected in parallel with the series connection main rectifier-ignitor-cathode (27–25a; 28–26a), said bypass means comprising fixed resistors 20, 33 and 22, 34, respectively, variable resistors 19 and 21, respectively, and a secondary rectifier 23 and 24, respectively; the resistors 33, 34 can be shunted by a switch 30, 31, respectively, connected in parallel therewith; these second switches are operatively or mechanically so coupled with the starter switches 29, 32, respectively, that all the switches 29–32 are moved simultaneously between their open and closed positions. The interconnection between these switches is symbolized in FIG. 4 by a dot-dash line.

In the position of the switches as shown in FIG. 4 the igniting circuits of the ignitrons are interrupted and a pulsating D.C. flows through the choke coils 35, 36 via the secondary rectifiers 23, 24, respectively, whereby these choke coils are first demagnetized and then progressively magnetized to reversed polarity, without however reaching saturation.

If then for carrying out a welding operation the switches 29–32 are moved into their closed positions, the two igniting circuits are completed; at the same time, the fixed resistors 33, 34, respectively, are shunted so that the bypass means comprise only the resistors 19, 20 and 21, 22, respectively, whereby the main rectifiers 27, 28 are caused to deliver only an "incomplete rectification." Consequently, the ignitrons 25, 26 ignite alternatingly with such a phase angle relationship as is determined by the time when the associated choke coils 35, 36, respectively, reach saturated condition. The phase angle just mentioned decreases during progressing magnetization of the choke cores during the first 3–10 cycles, resulting in an efficient "slow control" upon closing the main circuit so that the welding current is switched on in a gradual manner. As soon as stationary conditions are established, a phase angle is set the magnitude of which depends upon the demagnetizing current in the bypass portion of the igniting circuit and may, therefore, be regulated and adjusted within broad limits by means of the variable resistors 19 and 21, respectively. Preferably, the mechanical control means of the two resistors 19, 21 are also mechanically coupled with each other for simultaneous operation; this mechanical coupling is symbolized in FIG. 4 by a dot-dash line between the resistors.

The arrangement and operation of the control device illustrated by FIG. 5 corresponds to a great extent to that illustrated by FIG. 4. Therefore, corresponding elements are indicated by identical reference numerals in both figures. The arrangement according to FIG. 5 is a modification of that of FIG. 4 and is designed to introduce a "slow control" also to the circuit breaking operation. To this end, the starter switches 29, 32 are eliminated from the igniting circuits, and in their stead switches 37, 38, coupled mechanically with each other as symbolized by a dot-dash line, are connected in parallel with the variable resistors 19 and 21, respectively. When the switches 37, 38 are moved into closed position a strong demagnetizing current flows through the bypass circuits 23, 20, 37 and 24, 22, 38, respectively, so that the choke coils 35, 36, respectively, will reach saturation condition only very late and that the ignition of the ignitrons 25, 26, respectively, is correspondingly delayed; then, the welding transformer 6 will be passed subsequently only by a weak continuous current which is just sufficient for effectively demagnetizing its core.

For starting the welding current the switches 37, 38 are moved to their open positions as shown in the drawing. Then, the demagnetizing current furnished to the choke coils 35, 36, respectively, through the bypass circuits drops and the choke coils are magnetized in a step-by-step manner. The phase lag appearing in the time required for the choke coils to reach saturation condition and consequently, for the ignitrons 25, 26, respectively, to be ignited, shifts due to the stepwise proceeding magnetization of the coils to ever increasingly smaller angles so that the primary current in the welding transformer 6 increases from one half-wave to the other. The phase applying to the actual ignition assuming finally a fixed value depends only upon the setting of the coupled resistors 29, 21 to a predetermined amount of resistance.

If then the switches 37, 38 are again moved into their closed positions the demagnetizing current flowing through the choke coils increases again; however, also the demagnetization does not occur abruptly but develops progressively in steps from one half-wave to the next one so that the phase position of the moment of ignition shifts now step-by-step to increasing phase lag values until a stationary condition is reached after about 3–10 half-waves in which only a weak alternating current flows through the primary winding of the transformer 6 so as to demagnetize the latter.

If it is intended to obtain a fully symmetric operation of the control arrangements shown in FIGS. 3–5, then a complete symmetry of the choke coils must be established which control the ignitrons 25, 26. In practice, it is rather difficult to achieve this by dimensioning the coils. Therefore, it is advisable to provide an arrangement illustrated by FIG. 6 which in all other parts corresponds to the embodiment of FIG. 5. In this modification, the choke coils 41, 42 are mounted on cores which carry an auxiliary coil 43, 44, respectively, and each of these auxiliary coils is connected to a source of A.C. potential in series with a variable resistor 45, 46, respectively. Connections are preferably made in such a manner that each auxiliary coil acts opposite to the associated choke coil. Then, the desired full symmetry can be achieved simply by suitably regulating the variable resistors 45, 46, respectively.

It can be seen that the auxiliary coils 43, 44 can be used also for other modifications of the previously described arrangements. For instance, it may be desirable in some cases to control or to modify the steepness of the rise of the welding current separately from the steepness of the drop of that current. In the control arrangements according to FIGS. 4 and 5 the steepness of the rise and drop of that current depends upon the setting of the variable resistors 19, 21, respectively. However, if chokes with a main coil and an auxiliary coil are used, then these auxiliary coils can also be connected in series with an "incomplete rectifier" the degree of "incomplete rectification" thereof being controllable by a variable or adjustable bypass means. If then the main coil of the choke is disconnected and reconnected by means of suitably coupled switches shortly before the auxiliary coil is disconnected and reconnected, then the characteristics of the circuit containing the main coil will determine the operation and behavior of the arrangement during the rise of the current, while the characteristics of the circuit containing the auxiliary coil will determine the corresponding features during the drop of the current, and either one of these characteristics can be adjusted and regulated independently of each other.

Of course, the control arrangements according to the invention are not only useful for the control of welding equipment, but also in connection with all other types of A.C. controls which are intended to produce a control which is variable within wide limits. In such cases the arrangement according to the invention offers the particular advantage that ignitrons can be controlled directly, i.e. without a thyratron arranged between the control and the ignitron. By using such an arrangement a very substantial reduction of cost and a corresponding simplification can be achieved for instance in connection with electronic frequency converters for high output which operate in accordance with the principle of "stacking" in sequence such portions of voltage waves as will together form an output wave of the desired frequency.

On the other hand, the application of the control arrangements according to this invention is not limited to the control of ignitrons and similar current-controlled gas-discharge tubes; the control arrangements according to the invention can also be used for the control of voltage-controlled gas-discharge tubes, as for instance those of the thyratron type, by using the rise of the current which occurs upon beginning of the saturation of the chokes for producing, for instance, a correspondingly rising voltage drop across a suitable ohmic or inductive resistance.

It will be understood that each of the elements described above, or two or more together, may also find a useful application in other types of control arrangements differing from the types described above.

While the invention has been illustrated and described as embodied in control arrangements for gas-discharge tubes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Control arrangement for a gas-discharge tube having a cathode, an anode and an igniting electrode, comprising, in combination, an igniting circuit including said igniting electrode and said cathode; a choke coil having a ferromagnetic core and being connected in said igniting circuit for influencing the rise and fall of current therein; valve means in series with said choke coil in said igniting circuit; and bypass means including a variable resistance adjustable to various resistance values and connected in parallel with said valve means for modifying the rectifying effect of said valve means, said choke coil and said bypass means being so dimensioned that upon application of an operating A.C. potential to said igniting circuit each half-wave passing said valve means causes said core to become oversaturated with one polarity and that each following half-wave passing through said bypass means causes a reversal of magnetization of said core to a degree depending on an adjusted resistance value of said variable resistance.

2. Control arrangement for a pair of gas-discharge tubes having each a cathode, an anode and an igniting electrode, and being connected in back-to-back arrangement, comprising, in combination, a first igniting circuit including the igniting electrode and the cathode of one of said tubes; a second igniting circut including the igniting electrode and the cathode of the other one of said tubes; a first choke coil having a ferromagnetic core and being connected in said first igniting circuit for influencing the rise and fall of current therein; a second choke coil having a ferromagnetic core and being connected in said second igniting circuit for influencing the rise and fall of current therein; first valve means in series with said first choke coil in said first igniting circuit; second valve means in series with said second choke coil in said second igniting circuit; first bypass means including a first variable resistance adjustable to various resistance values and connected in parallel with said first valve means for modifying the rectifying effect of said first valve means; and second bypass means including a second variable resistance adjustable to various resistance values and connected in parallel with said second valve means for modifying the rectifying effect of said second valve means; said first choke coil and said first bypass means as well as said second choke coil and said second bypass means being respectively so dimensioned that upon application of an operating A.C. potential to either one of said igniting circuits each half-wave passing the valve means of either one of said igniting circuits causes the core of the choke coil in series therewith to become oversaturated with one polarity and that each following half-wave passing through the bypass means connected in parallel therewith causes a reversal of magnetization of the particular core to a degree depending upon an adjusted resistance value of said variable resistance in the pertaining bypass means.

3. Control arrangement as set forth in claim 1, wherein said bypass means is a variable ohmic resistance.

4. Control arrangement as set forth in claim 1, wherein said bypass means is a variable impedance.

5. Control arrangement as set forth in claim 2, wherein in each igniting circuit said bypass means comprises a variable resistor and an auxiliary valve means whose polarity is opposite to that of said valve means in the particular igniting circuit.

6. Control arrangement as set forth in claim 2, wherein said variable resistances in said first and second bypass means, respectively, are operatively connected with each other for simultaneous adjustment.

7. Control arrangement as set forth in claim 6, wherein said first and second igniting circuits are connected with each other across auxiliary resistor means, and switch means being connected in parallel with said auxiliary resistor means movable between a closed position shunting said auxiliary resistor means and permitting the igniting current to flow through either one of said igniting circuits, and an open position in which the current flowing through said igniting circuits is reduced to an amount insufficient to cause ignition, but sufficient to demagnetize the cores of said choke coils even if any one of said cores should have been saturated at the moment of moving said switch means into its open position.

8. Control arrangement as set forth in claim 5, wherein said gas-discharge tubes are ignitrons having a cathode, an anode and an ignitor, and in each of said igniting circuits said ignitor is connected to the anode in series with said choke coil and said valve means, and wherein said bypass means is connected in parallel with the series combination consisting of said valve means and said ignitor.

9. Control arrangement as set forth in claim 8, including starter switch means respectively in series with said ignitor in each of said igniting circuits.

10. Control arrangement as set forth in claim 9, wherein in each of said igniting circuits said bypass means includes at least two resistors and second switch means connected in parallel with one of said resistors, said second switch means operatively connected with said starter switch means for simultaneous actuation so that when both switch means are in open position a current of prelimited magnitude is permitted to flow through said bypass means and said choke coil.

11. Control arrangement as set forth in claim 2, wherein said gas-discharge tubes are connected in circuit with the primary winding of a welding transformer, said choke coil being so dimensioned that said primary winding is passed by a demagnetizing alternating current of comparatively low intensity when said gas-discharge tubes are not operating.

12. Control arrangement as set forth in claim 2, wherein a regulator means is operatively connected with each of said choke coils for varying its characteristics, said regulator means including a second coil mounted on the core of the particular choke coil, and circuit means including current control means connecting said second coil with a source of alternating potential.

13. Control arrangement as set forth in claim 12, wherein said circuit means include a parallel combination of valve means and bypass means modifying the rectifying effect of said valve means, said parallel combination being connected in series with said second coil.

14. Control arrangement as set forth in claim 1, wherein said core of said choke coil comprises at least two portions consisting of metals having different magnetic characteristics, said metals differing magnetically by having magnetization curves of different steepness and differing in their saturation characteristic.

15. Control arrangement as set forth in claim 2, wherein said bypass means is a variable ohmic resistance.

16. Control arrangement as set forth in claim 2, wherein said bypass means is a variable impedance.

17. Control arrangement as set forth in claim 1, wherein said bypass means comprises a variable resistor and an auxiliary valve means whose polarity is opposite to that of said valve means in said igniting circuit.

18. Control arrangement as set forth in claim 6, wherein in each igniting circuit said bypass means comprises, in addition to said variable resistance, an auxiliary valve means whose polarity is opposite to that of said valve means in the particular igniting circuit, and wherein each bypass circuit comprises a normally open switch connected for shunting, when moved into closed position, said variable resistance, said switch in said first bypass means being coupled with said switch in said second bypass means for simultaneous actuation.

References Cited in the file of this patent
UNITED STATES PATENTS

| | | |
|---|---|---|
| 2,250,961 | Livington | July 29, 1941 |
| 2,359,143 | Meyer et al. | Sept. 26, 1944 |
| 2,441,987 | Boyer | May 25, 1948 |
| 2,459,582 | Pakala | Jan. 18, 1949 |
| 2,632,870 | Boyer | Mar. 24, 1953 |
| 2,820,178 | Harms | Jan. 14, 1958 |